US008526762B2

(12) United States Patent
Cooper

(10) Patent No.: US 8,526,762 B2
(45) Date of Patent: Sep. 3, 2013

(54) METHOD AND APPARATUS FOR DETERMINING THE MIS-ALIGNMENT IN IMAGES

(75) Inventor: Richard Jared Cooper, Basingstoke (GB)

(73) Assignee: Sony Corporation, Tokyo (JP)

( * ) Notice: Subject to any disclaimer, the term of this patent is extended or adjusted under 35 U.S.C. 154(b) by 471 days.

(21) Appl. No.: 12/852,718

(22) Filed: Aug. 9, 2010

(65) Prior Publication Data

US 2011/0058749 A1  Mar. 10, 2011

(30) Foreign Application Priority Data

Sep. 4, 2009 (GB) .................................. 0915495.6

(51) Int. Cl.
*G06K 9/32* (2006.01)
*G06K 9/20* (2006.01)
*G06K 9/36* (2006.01)

(52) U.S. Cl.
USPC ........... 382/294; 382/282; 382/284; 382/286; 382/289; 382/293; 382/295; 382/296

(58) Field of Classification Search
USPC .................. 382/284, 282, 286, 289, 293–296
See application file for complete search history.

(56) References Cited

U.S. PATENT DOCUMENTS

| 4,677,481 | A | 6/1987 | Nicholas |
| 5,343,298 | A | 8/1994 | Larson et al. |
| 7,813,589 | B2 * | 10/2010 | Silverstein et al. ........... 382/284 |
| 2003/0152260 | A1 | 8/2003 | Cai |
| 2005/0129325 | A1 | 6/2005 | Wu |
| 2005/0157949 | A1 * | 7/2005 | Aiso et al. ..................... 382/299 |
| 2006/0256397 | A1 * | 11/2006 | Cui ............................... 358/450 |

(Continued)

FOREIGN PATENT DOCUMENTS

| EP | 1 964 061 | 6/2007 |
| JP | 2008-22390 | 1/2008 |

(Continued)

OTHER PUBLICATIONS

Omni Tek—"Waveform Monitors, Video Signal Generators and Picture Quality Analyzers", Advanced Measurement Technology, Brochure available at http://www.omnitek.tv/omnitek-tq.php, copyright 2009; original brochure publication date unavailable, p. 1-5

(Continued)

*Primary Examiner* — Anand Bhatnagar
*Assistant Examiner* — Soo Park
(74) *Attorney, Agent, or Firm* — Oblon, Spivak, McClelland, Maier & Neustadt, L.L.P.

(57) ABSTRACT

A method of determining the amount of mis-alignment in one direction of an image of a scene, the image captured by a first camera is described. The method comprising the steps of:
defining a line between a first point in the image and a second point in the image, the line extending in the direction of mis-alignment;
defining a reference section in the scene to which the image is to be aligned, the reference section of the scene having a reference image characteristic;
identifying an image characteristic at different points along the line in the image; and
comparing the image characteristic at each point along the line with the reference image characteristic, and determining the amount of mis-alignment by determining the distance between the position of the reference image characteristic of the reference section captured in the image and the defined reference section in the scene.

29 Claims, 14 Drawing Sheets

(56) References Cited

U.S. PATENT DOCUMENTS

2007/0122059 A1* 5/2007 Ejiri et al. .................. 382/284
2008/0170803 A1* 7/2008 Forutanpour ............... 382/284
2010/0008580 A1* 1/2010 Mizuno ....................... 382/176
2011/0064327 A1* 3/2011 Dagher et al. ............... 382/263

FOREIGN PATENT DOCUMENTS

| JP | 2008-54148 | 3/2008 |
| KR | 10-0778085 | 11/2007 |
| WO | WO 2007/063352 A1 | 6/2007 |

OTHER PUBLICATIONS

Omni Tek—"Complete Video and Audio Monitoring for Broadcast and Transmission Quality Control", Advanced Measurement Technology, Brochure available at http://www.omnitek.tv, copyright 2009; original brochure publication date unavailable, 6 pages.
"The SIP2100 Stereo Image Processor", 3ALITY Digital, http://quantel.com, 4 pages, SIP2100 available since Sep. 2008 (IBC 2008).
Quantel White Paper, "Stereoscopic3D Post Using the 3ality Digital 3flex™ SIP2100", Nov. 2008, pp. 1-14.

* cited by examiner

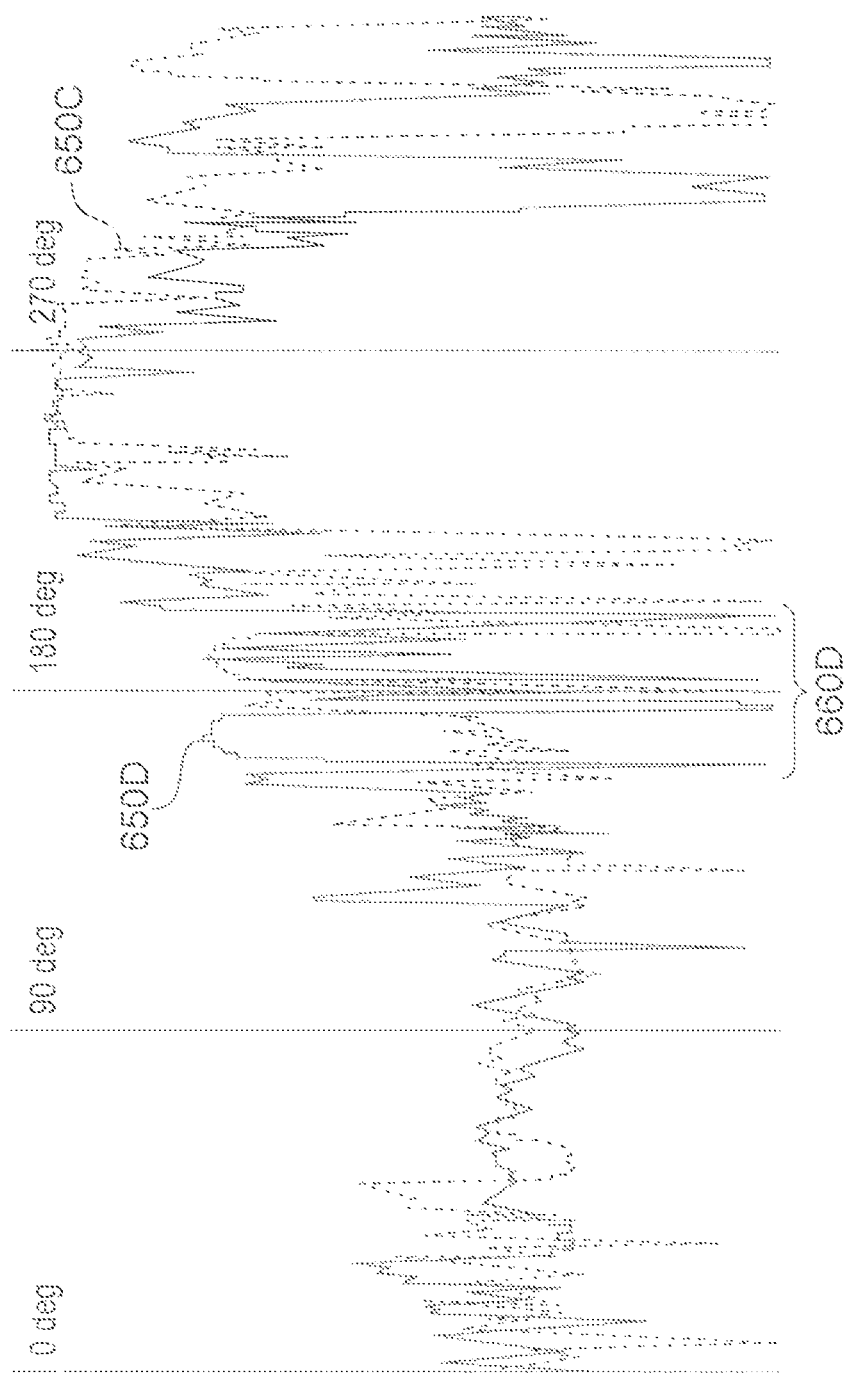

METHOD AND APPARATUS FOR DETERMINING THE MIS-ALIGNMENT IN IMAGES

BACKGROUND OF THE INVENTION

1. Field of the Invention

The present invention relates to a method and apparatus for determining the mis-alignment in images.

2. Description of the Prior Art

In order to make 3 dimensional (3D) images it is necessary to take two shots of the same scene and displace one image slightly relative to the other image. This means that it is necessary to carefully align the images before the images are displaced. In order to achieve this alignment a special camera rig is normally used to capture the two shots. One such rig is produced by 3ality.

However, due to the complexity of the alignment process, these rigs take a long time to set up. This is very undesirable, particularly in live television production where the shooting schedule is closely managed.

Further, these rigs are very expensive. Typically, the cost of a 3D rig is so high that they are rented by program-makers rather than purchased.

It is desirable therefore to produce the required alignment without the need for traditional 3D rigs that are both difficult to set up and expensive. It is an aim of the present invention to alleviate these problems.

SUMMARY OF THE INVENTION

According to a first aspect of the present invention, there is provided a method of determining the amount of mis-alignment in one direction of an image of a scene, the image captured by a first camera and the method comprising:

defining a line between a first point in the image and a second point in the image, the line extending in the direction of mis-alignment;

defining a reference section in the scene to which the image is to be aligned, the reference section of the scene having a reference image characteristic;

identifying an image characteristic at different points along the line in the image; and comparing the image characteristic at each point along the line with the reference image characteristic, and determining the amount of mis-alignment by determining the distance between the position of the reference image characteristic of the reference section captured in the image and the defined reference section in the scene.

This is advantageous because it allows the mis-alignment to be determined quickly and therefore allows any transformation to be made to the image to correct for such mis-alignment, should it be necessary.

The method may further comprise capturing a second image using a second camera, whereby the first and second image have an area of overlap and the reference section in the scene is located in the area of overlap; defining a second line between a first point in the second image to a second point in the second image the second line being drawn in the direction of mis-alignment and intersecting with the reference section, the reference section having a second reference image characteristic; identifying an image characteristic at different points along the second line in the second image; and comparing the image characteristic at each point along the line in the first image with the image characteristic at each point along the second line in the second image, whereby the amount of mis-alignment is determined in accordance with the difference in position between the position of the reference image characteristic in the first image and the second reference image characteristic in the second image.

This allows for mis-alignment between two images to be measured.

The image characteristic in the first or second image may be formed by interpolation of a plurality of pixel values. This allows for the mis-alignment in any direction to be corrected.

The interpolation may be bilinear interpolation of the nearest four pixel values.

The method may further comprise displaying a polar template upon the first image and the second image, the polar template having a circular template line and a radial template line having a centre point coincident with the optical axis of the camera capturing the image, the line between the first and second points in the first image, being defined by one or more of the circular template line and the radial template line.

This allows for an appropriate boundary to be drawn quickly. Thus, this reduces the time taken to determine the amount of mis-alignment.

The method may comprise determining the image characteristics at positions in an area surrounding the first or second line, the positions being a substantially similar distance from the optical axis of the camera capturing the image.

According embodiments, there is provided a method of aligning an image, comprising:

a method of determining the non-alignment according to any of the embodiments; and transforming the first image until the distance between the image characteristic of the captured section and the reference section is within a predetermined threshold.

The first image may be transformed along the line between the first and second point.

The line in the first image and the line in the second image may be a circular line, and the first image has a roll transformation applied thereto.

The line in the first image and the line in the second image may be a radial line and the second image has a transformation applied along the length of the radial line.

According to another aspect, there is provided a computer program comprising computer readable instructions which, when loaded onto a computer, configures the computer to perform a method according to any embodiment of the present invention.

A computer readable storage medium configured to store the computer program is also provided.

According to another aspect, there is provided an apparatus for determining the amount of mis-alignment in one direction of an image of a scene, the image captured by a first camera and the apparatus comprising:

a definer operable to define a line between a first point in the image and a second point in the image, the line in the direction of mis-alignment;

the definer being further operable to define a reference section in the scene to which the image is to be aligned, the reference section of the scene having a reference image characteristic;

an identifier operable to identify an image characteristic at different points along the line in the image; and a comparator operable to comparing the image characteristic at each point along the line with the reference image characteristic, and determining the amount of mis-alignment by determining the distance between the position of the reference image characteristic of the reference section captured in the image and the defined reference section in the scene.

The apparatus may further comprise an input connectable to a second camera which is operable to capture a second image, whereby the first and second image have an area of overlap and the reference section in the scene is located in the area of overlap;

the definer being further operable to define a second line extending between a first point in the second image to a second point in the second image the second line extending in the direction of mis-alignment and intersecting with the reference section, the reference section having a second reference image characteristic;

the identifier operable to identify an image characteristic at different points along the second line in the second image; and the comparator operable to compare the image characteristic at each point along the line in the first image with the image characteristic at each point along the second line in the second image, whereby the amount of mis-alignment is determined in accordance with the difference in position between the position of the reference image characteristic in the first image and the second reference image characteristic in the second image.

The image characteristic in the first or second image may be formed by interpolation of a plurality of pixel values.

The interpolation may be bilinear interpolation of the nearest four pixel values.

The apparatus may further comprise a display operable to display a polar template upon the first image and the second image, the polar template having a circular template line and a radial template line having a centre point coincident with the optical axis of the camera capturing the image, the line extending between the first and second points in the first image, being defined by one or more of the circular template line and the radial template line.

The determiner may be operable to determine the image characteristics at positions in an area surrounding the first or second line, the positions being a substantially similar distance from the optical axis of the camera capturing the image.

There is also provided a device for aligning an image, comprising:

an apparatus for determining the mis-alignment according to embodiments of the invention; and a transformer operable to transform the first image until the distance between the image characteristic of the captured section and the reference section is below a threshold distance.

The first image may be transformed along the line extending between the first and second point.

The line in the first image and the line in the first image may be a circular line, and the first image has a roll transformation applied thereto.

The line in the first image and the line in the second image may be a radial line and the first image has a transformation applied along the length of the radial line.

There is also provided a system comprising a first and second camera connected to an apparatus according to any embodiment or a device according to any embodiment.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 6A to 6D show a representation of a trace mode for establishing the amount of roll distortion according to embodiments of the present invention;

DESCRIPTION OF THE PREFERRED EMBODIMENTS

Figure 1:
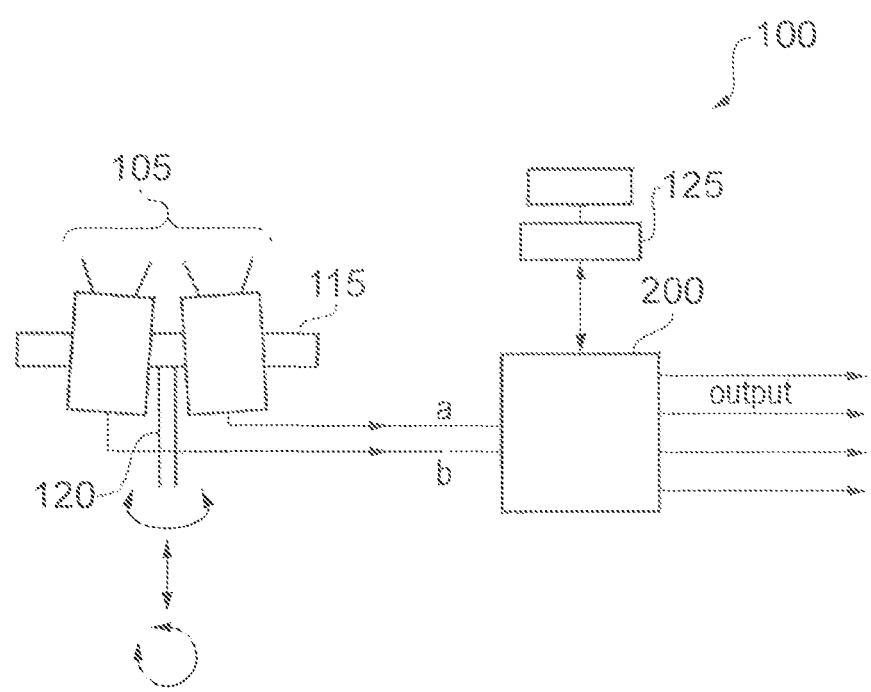
FIG. 1 shows a system for capturing images for use in generating a 3 dimensional image according to an embodiment of the invention.

Referring to FIG. 1, a system 100 for capturing images of a scene for use in generating a 3D image is shown. The system 100 has a camera rig 115 upon which two cameras 105 are mounted. These cameras may be video cameras or still cameras. Although not shown in FIG. 1, the yaw of each camera 105 relative to each other can be changed. Specifically, whilst mounted on the rig 115, the pitch and roll of each camera 105 is usually fixed relative to one another. However, the yaw of each camera 105 can be adjusted independently of one another. This allows the cameras 105 "toe-in" to be changed. Once locked in place (i.e. fixed to the rig 115), the yaw, pitch and roll of the rig 115 can be moved in unison. The yaw, pitch and roll of the rig 115 is moved by arm 120. The position of the rig 115 can be locked in place by twisting arm 120.

The output feed from each camera 105 is fed into a workstation 200 according to embodiments of the present invention. These outputs are labelled a and b in FIG. 1. The output feed from each camera 105 includes image data. However, other data may also be fed out of each camera. For instance, metadata may be also fed out of each camera. The metadata may relate to the camera settings, such as aperture settings, focal length and/or zoom of each camera. Additionally, the metadata may include information about the camera operator or good shot markers or the like. In this embodiment, the output feeds from each camera 105 may be connected using wires or over a network. Indeed, the connection between the cameras 105 and the workstation 200 may be wireless. This means that the workstation 200 may be located remotely to the camera rig 115.

Additionally connected to the workstation 200 is a user terminal 125. The user terminal 125 allows a user to control the workstation 200 during the alignment process as will be explained hereinafter. There are also a number of output feeds from the workstation 200. In the specific embodiment there are 4 output feeds, as will be explained later, however the invention is not so limited and fewer or more than 4 may also be used.

Figure 2:
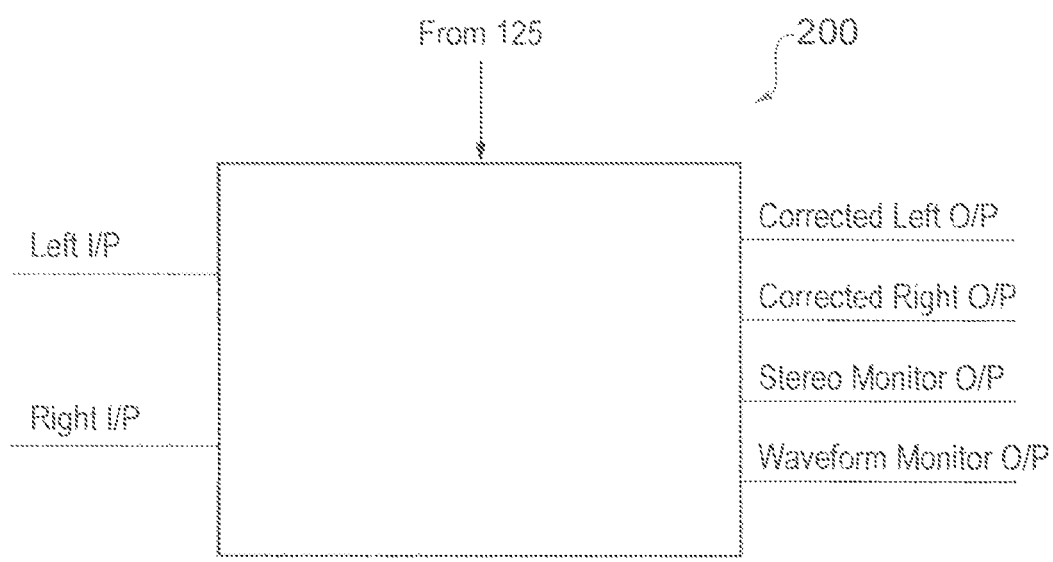
FIG. 2 shows a workstation used in the system of FIG. 1.

Referring to FIG. 2, a workstation 200 according to embodiments of the present invention is shown. The workstation 200 according to embodiments of the invention contains a cell processor based architecture (designed by Sony, Toshiba and IBM) as this is specifically designed to handle large amounts of data processing. This is particularly suited to image processing tasks. The workstation 200 has two input feeds; one input feed from each camera 105 (labelled "left i/p" and "right i/p" in FIG. 2). As noted in FIGS. 1 and 2, there are four output feeds from the workstation 200; corrected left output feed, corrected right output feed, stereo monitor output feed and waveform monitor output feed. These will be explained later. Additionally, the connection to the user terminal 125 is shown in FIG. 2.

As will be appreciated, this configuration of input feeds and output feeds means that one workstation is provided per camera pair (i.e. for each pair of left and right cameras). It is possible that this configuration may be extended. In particular, if a further High Definition-Serial Digital Interface (HD-SDI) card is available, then the configuration can be extended to support a Dual-Link 4:4:4 output. This type of output is particularly useful for showing anaglyph outputs for the stereo monitor output feed. The operation of the workstation 200 will be explained later with reference to FIGS. 4 to 6.

Figure 3:
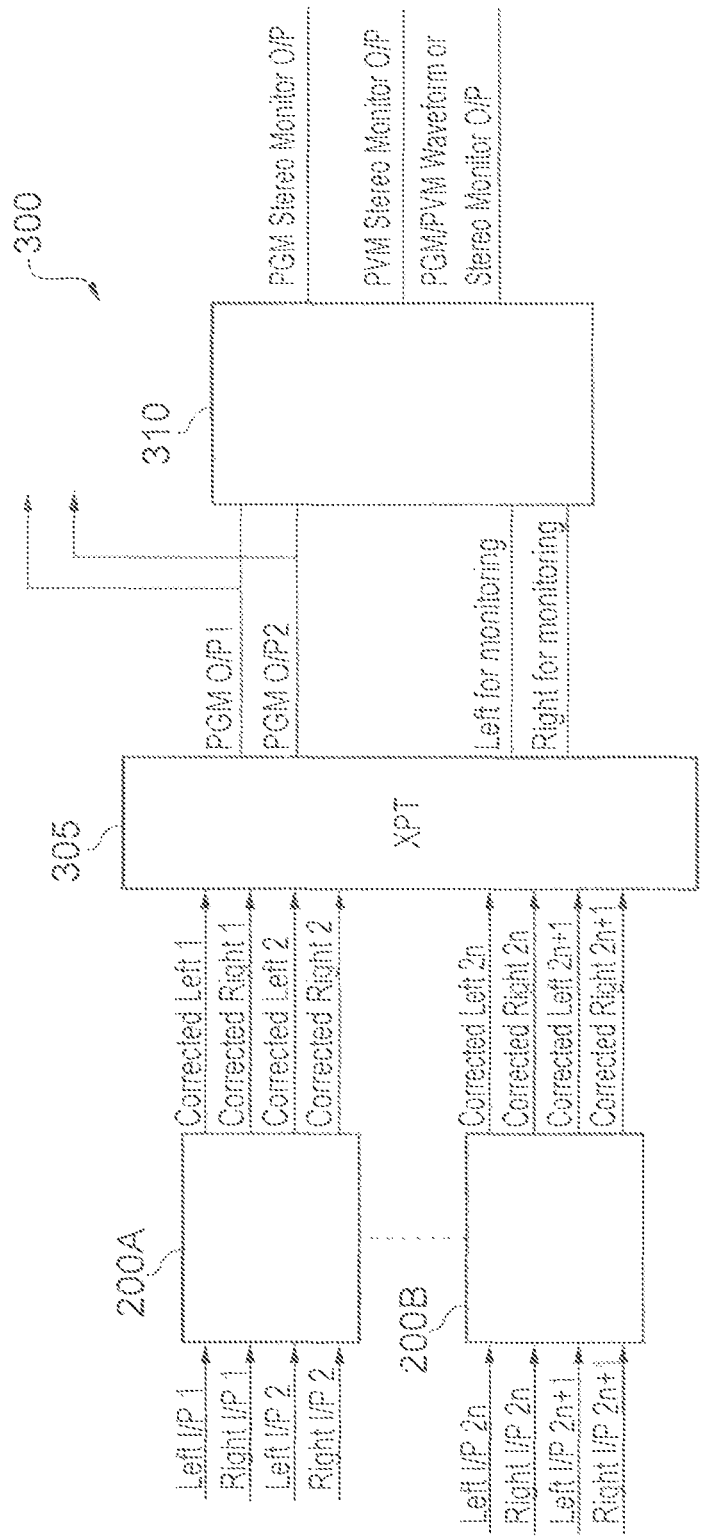
FIG. 3 shows the system of FIG. 1 using multiple numbers of the workstations of FIG. 2.

With reference to FIG. 3, a system 300 having multiple workstations using a single link HD-SDI is shown. In this arrangement there are two workstations 200A 200B shown. However, in embodiments, the invention is completely scalable to receive inputs from any number of camera pairs. The first workstation 200A has an input from a first and second camera pair. In other words, there are four separate camera feeds into the first workstation 200A. Similarly, the second workstation 200B has an input from a third and fourth camera pair.

The output feeds from the first workstation 200A are an output corrected left feed for the first camera pair and an output corrected right feed for the first camera pair. Additionally, an output corrected left feed for the second camera pair and an output corrected right feed for the second camera pair is provided from the first workstation 200A. Similarly, the output feeds from the second workstation 200B are an output corrected left feed for the third camera pair and an output corrected right feed for the third camera pair. Additionally, an output corrected left feed for the fourth camera pair and an output corrected right feed for the fourth camera pair is provided from the second workstation 200B.

These output feeds from the first and second workstation 200A 200B are fed into a crosspoint switcher (XPT) 305. The XPT 305 could be either a crosspoint or a switcher, which will include a crosspoint. As the skilled person will appreciate, the crosspoint allows any input to be mapped to any output, and the switcher allows effects to be applied when the mapping of the input to the output is changed. So, it is possible to change the output camera pair with a wipe or a fade-in effect.

Additionally, a left output feed and a right output feed is provided by the XPT 305. The XPT 305 selects an output feed from one of the camera pairs for monitoring based on a selection made by an operator of the XPT 305. However, it is possible that the user terminal 125 can instead control the XPT 305. In other words, either the operator of the XPT 305 or the user terminal 125 can select which of the camera pairs are to be displayed on the left and right monitor and the XPT 305 selects the corrected left and right feed from the appropriate camera pair.

The left and right output feed and the left and right output monitor feed is fed into a monitoring workstation 310. The monitoring workstation 310 is based on a Cell processor as the Cell processor is specifically suited to handle image processing tasks as noted above.

The outputs from the monitoring workstation 310 are a program stereo monitor output, a preview stereo monitor output and a program/preview waveform or stereo monitor output. As the skilled person will appreciate, the program stereo monitor output is the live feed that is being sent for broadcast, the preview stereo monitor output is a version of the live feed allowing different effects to be attempted "off-air", and the program/preview waveform is a dual feed containing either the program stereo monitor output or the preview stereo monitor output.

In an alternative embodiment to that discussed in FIG. 3, it is possible that instead of a single link HD-SDI, a dual link HD SDI is used.

The input camera feeds are high definition, and specifically are 1920×1080 pixel resolution; with a frame rate that is one of a 23.98 Progressive Segmented Frame (PsF), 24PsF, 25Psf, 29.97PsF, 30PsF 50 interlaced (i), 59.94i or 60i. As would be appreciated, 50 Progressive (P), 59.94P and 60P could also be supported, but in this case, each workstation 200A 200B would be able to support only one camera pair due to the number of HD-SDI inputs in the workstation 200. Additionally, as would be appreciated, the increase in the number of cameras would increase the processing power required. Alternatively, the input camera feeds could have a resolution of 1280×720 pixels, with one of 50P, 59.94 or 60P. The output feeds provided by the monitoring workstation 310 may be the same type as those of the input camera feeds. However, this is not necessary. Indeed, the output feeds may be of a different type to the input camera feeds. For example, the output feeds may be downconverted into a lower resolution picture which can be recorded onto a recording medium. This may be useful for a "rush" edit whereby a rough cut of the captured material is performed to ensure that all the required shots have been captured.

The alignment process according to embodiments of the invention will now be described. This process allows the output feeds from the left and right camera in a camera pair to be aligned even if the left and right camera 105 mounted on the camera rig 115 are not fully aligned. As will become apparent, because the alignment process requires pixel characteristic information, the output feed from the left and right camera may be subjected to colour matching before the alignment process begins. This is particularly the case if the 3D rig includes a beam splitter. Although not necessary, colour matching ensures that the colour characteristics of homologous pixels in each output camera feed match before proceeding with the positional alignment process. This may improve the accuracy to which the images are aligned. In order to perform the colour matching, prior to the alignment, the user will identify at least one area on the left and right output camera feed image which should be an exact colour match. From this information, the user can determine the level of colour matching to be applied to that area and across the entire image. This is achieved by adjusting the parameters of one or both colours using a dedicated user interface. In embodiments of the invention, the user controls the colour matching using three sets of controls; one for each of the R, G and B characteristics. These types of controls are known in the field of broadcast video processing and so will not be discussed further here. Moreover, although this controller, in embodiments, is integrated in the user terminal, the present invention is not limited to this. Indeed, it is envisaged that such controller can be separate to the terminal.

Once the difference in colour has been determined, then this gives an indication of the difference between the colours captured by the left and right cameras and can thus be applied to all images from the output feeds.

After colour correction, the corrected output feed from the left camera in a camera pair is displayed 401. Similarly, the corrected output from the right camera in the same camera pair is displayed 402. An area 404 in the displayed corrected left camera feed 401 is selected and an area 403 in the displayed corrected right camera feed 402 is selected by the user of the user terminal 125. As the selected areas 403 and 404 will be used to align the left and right images 401 402, the selected areas should include a feature in the scene which is captured by both the left camera and the right camera. In the specific embodiment, as the scene captured by both the left camera and the right camera are very similar, there are many features that are captured by both the left camera and the right camera. However, if the scene captured by both the left and right camera have only a small area of overlap in their field of views, then the selected area should include at least a part of this overlap.

The selected area 404' of the corrected output feed from the left camera 401 is displayed underneath the corrected output feed from the left camera 401. Additionally, the selected area 403' of the corrected output feed from the right camera 402 is displayed underneath the corrected output feed from the right camera 402. The displayed selected areas 403' 404' are a version of the selected area 403 404 with a zoom applied. In other words, a digital zoom is applied to each of the selected areas 401 402, and the result of the zoomed area is displayed in the displayed selected areas 403' 404' underneath the corrected output feed from the left camera and right camera respectively. By applying the zoom, the size of the selected areas is increased and is easier to view by the user.

A first region 404A and a second region 404B within the displayed selected area 404' from the corrected output feed of the left camera and a first region 403A and a second region 403B within the displayed selected area 403' from the corrected output feed of the right camera 402 is determined by the user terminal 125. As will be apparent, both first regions 403A and 404A select a range of vertical columns of pixels and the second region 403B and 404B select a range of horizontal lines of pixels. However, the invention is not so limited. Both first regions 403A and 404A and 403A and 404B can select a range of sampling points in any direction. Indeed, the directions need not be the same.

On the display 400 a section 410 displaying waveforms is provided. In the waveform displaying section 410, there is displayed a first waveform 415 and a second waveform 417. These waveforms generally display pixel characteristics, such as the red, green and blue (RGB) components within the pixels or groups of pixels. However, the invention is not so limited. Indeed, the waveforms may display any characteristics of a pixel or a pixel group, such as luminance levels, colour difference levels (Cr, Cb levels), or the like. In embodiments, the first waveform 415 displays a superposition of multiple traces where each trace corresponds to one of the selected lines of pixels extending in the x-direction of FIG. 4. Each point on the x-axis of the first waveform 415 corresponds to a pixel position along the x-axis of the second region 404B. This displayed line is in red and has a point 404C in the first waveform.

Overlaid on this is a line showing a waveform generated by performing a similar technique on region 403B. This displayed line is in cyan has a point 403C in the first waveform. It should be noted here that the two lines in the first waveform are in a different colour to enable the lines to be distinguished from one another. However, it is also possible that where the lines overlap, a third colour (in embodiments, white) is displayed.

Figure 4:
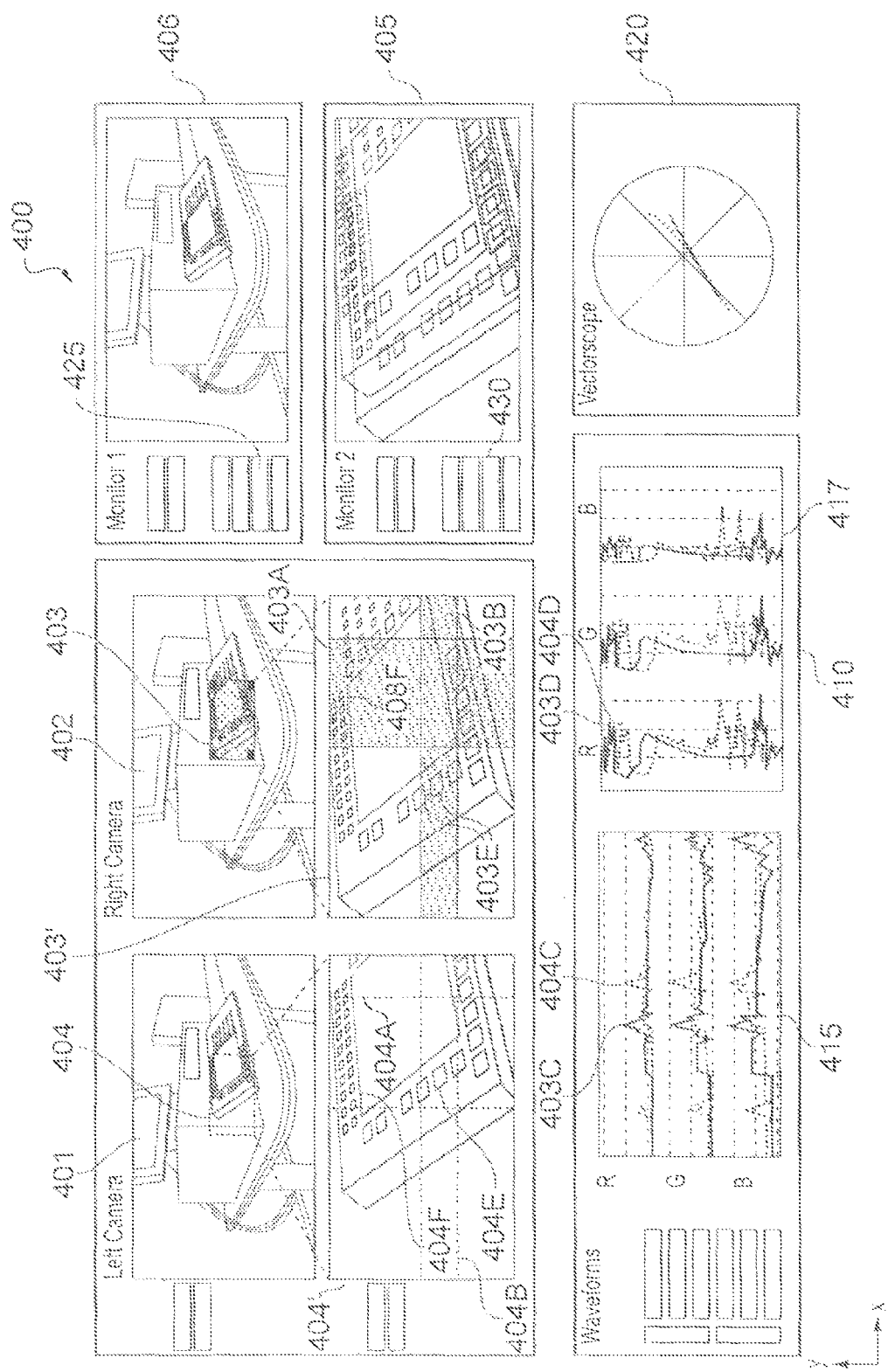
FIG. 4 shows a representation of the interface used with the workstation of FIG. 2.

The second waveform 417 displays a superposition of multiple traces where each trace corresponds to one of the selected lines of pixels extending in the y-direction of FIG. 4. Each point on the y-axis of the second waveform 417 corresponds to one of the selected lines of pixels extending along the y axis of the first region 404A. This trace is in red and has a point 404D in the second waveform Overlaid on this is a line showing a similar trace for the second region 403B. This trace is in cyan and has point 403D. It is possible that any two different colours are used to distinguish the lines, and a third colour (in embodiments, white) can be used to display common traces.

At points 403C and 404C very similar pixel characteristics can be seen. In fact, point 403C corresponds to the buttons 403E in the scene of the second zoomed region 403'. Similarly, point 404C corresponds to the buttons 404E in the scene of the zoomed first region 404'. These buttons are the same feature within the scene captured by the left camera and the right camera. However, from looking at the first waveform 415, it is immediately apparent that points 403C and 404C are not located at the same position in the x direction. This means that the corrected output feed from the left camera 401 and the corrected output feed from the right camera 402 are not fully aligned. In other words, the corrected output feed from the left camera 401 and the corrected output feed from the right camera 402 do not fully overlap. Indeed, by providing the first waveform in this overlaid manner, it is possible to establish that the corrected output feed from the left camera 401 is aligned to the right of the corrected output feed of the right camera 402.

Similarly, points 403D and 404D show very similar pixel characteristics. In fact, point 403D corresponds to the buttons 404F in the first region 404. Similarly, point 404D corresponds to the buttons 403F in the second region 403. In other words, line 403D and 404D represent the same feature within the scene captured by the left camera and the right camera. However, from looking at the second waveform 417, it is apparent that points 403D and 404D are not located at the same position in the y direction. Thus, buttons 403F and 404F are not fully aligned in the y direction. This means that the corrected output feed from the left camera 401 and the corrected output feed from the right camera 402 are not fully aligned in the y direction. Indeed, by providing the second waveform 417 in this overlaid manner, it is possible to establish that the corrected output feed from the left camera is not aligned and is, in fact, beneath the corrected output feed of the right camera 402.

Indeed, as noted earlier, each point in the x-direction of the first waveform 415 corresponds to a pixel position in the x-direction of the second regions 403B and 404B, and each point in the y-direction of the second waveform 417 corresponds to a pixel position in the y-direction of the first regions 403A and 404A. This means that by knowing the distance between points 403C and 404C, it is possible to determine the offset in the x-direction between the corrected output from the left camera 401 and the corrected output from the right camera 402. Similarly, by knowing the distance between points 403D and 404D, it is possible to determine the offset in the y-direction between the corrected output from the left camera 401 and the corrected output from the right camera 402. This means that by simply analysing the distance between the points 403C and 404C and between points 404C and 404D, it is possible to determine when the corrected output from the left camera 401 and the corrected output from the right camera 402 are sufficiently aligned in a particular direction.

As would be appreciated, the alignment may be sufficient if the corrected outputs are offset by a predetermined distance in a particular direction. For instance, when shooting 3D footage, it is necessary to offset the corrected outputs by a predetermined amount in the x direction, whilst fully aligning the images in the y-direction. However, for image stitching it is desirable to fully align the images in both the x-direction and the y-direction. The invention is not limited to 3D or image stitching and any level of alignment in any direction is also envisaged. For example in image stabilisation, full alignment is useful. Further, it is possible to align images taken at different times.

It is possible to use this information to adjust the alignment of the cameras 105 located on the camera rig 115. In order to do this, appropriate information controlling a servo motor would be generated by the workstation 200 and fed to a servo controller (not shown). Also, this information could be provided to a manual rig operator. However, in order to reduce the cost and design complexity of the rig 115, in embodiments it is possible to transform the corrected output images from the left or right camera 401 402 to realise such an alignment. This transformation of the corrected output feed from the left camera 401 will now be described. Although the transformation of only one output feed is described, the invention is not limited and either one or both images may be transformed.

Three movements that a camera can make are yaw (rotation about the x direction of FIG. 4), pitch (rotation about the y direction of FIG. 4) and roll (rotation about the optical axis of the camera). It is possible to replicate this movement of the camera in the output feeds from the camera. In order to do this, the output feed is transformed using an aggregate of rotations, zoom, transforms and projections in a 4×4 matrix. This type of transform is sometimes referred to as a model view projection matrix. This transform requires the field of view of the left camera and the right camera.

As noted before, it is possible to determine that the output feed from the left camera 401 is located to the right of the output feed from the right camera 402. In order to correct this, and if required, a yaw transformation moving the output of the left camera 401 to the right is applied to the output feed of the left camera 401. A planar shift is also envisaged. After the output feed from the left camera 401 is transformed, the distance between points 403C and 404C is measured. If the distance between points 403C and 404C is at or below a certain threshold, for example the desired interocular distance ±1 pixel for 3D footage, then the yaw transformation is stopped. However, if the distance between points 403C and 404C is above the threshold then the yaw transformation is continued.

Moreover, as noted above, in embodiments, as the width (i.e. the length in the x direction) of region 404B and 403B is known, the length (i.e. how many pixels the waveform represents) of the waveform 415 is known, and the field of view of the camera (or equivalent information) by determining the distance between the two points 403C and 404C, it is possible to determine how much yaw transformation is required to appropriately align the corrected output feeds. This increases the speed at which alignment takes place compared to an iterative method.

After the images are appropriately aligned in the x direction, a pitch transformation is applied to the corrected output feed from the left camera 401 to move this feed upwards. This is because the output feed from the left camera is aligned below the output feed from the right camera 402. After the output feed from the left camera 401 is transformed, the distance between points 403D and 404D is measured. If the distance between points 404C and 404D is at or below a certain threshold, for example fully aligned ±1 pixel, then the pitch transformation is stopped. However, if the distance between points 403D and 404D is above the threshold then the pitch transformation is continued.

Moreover, in embodiments, the height (i.e. the length in the y direction) of region 404A and 403A is known, the length (i.e. how many pixels the waveform represents) of the waveform 417 is known, and the field of view of the camera (or equivalent information) by determining the distance between the two points 403D and 404D. Therefore it is possible to determine how much pitch transformation is required to appropriately align the output feeds. This increases the speed at which alignment takes place compared to an iterative method.

It should be noted here that although the foregoing appropriate alignment was performed by applying a horizontal shift followed by a vertical shift to one image, the invention is not so limited. For example, it is possible that roll rotation correction may need to be applied to an output feed from a camera. This will remove any incorrect roll angle applied at either camera. An embodiment of the invention which relates to correcting for roll rotation will be described later with reference to FIG. 6A. Further, as noted above the alignment process assumes that the focal length of both cameras is the same. However, in cases where it is not possible to obtain alignment using the pitch, yaw and roll corrections, zoom correction is applied. This is achieved by scaling one or both images. At each different focal length, the process of applying the pitch, yaw and roll correction takes place, if necessary.

In addition to the first and second waveform 415 417, a vectorscope 420 is provided. Vectorscopes 420 are known and plot chrominance information. On the vectorscope 420 in embodiments of the invention, the chrominance information for the pixels plotted on the first waveform is shown. By plotting the chrominance information, it is possible to perform colour matching. So, by selecting one or more features in the scene which should have the same colour, it is possible to alter the colour characteristics of the featured captured by either camera until the colours on the vectorscope 420 are the same.

Additionally displayed are a first monitor output 406 and a second monitor output 405. The first monitor output 406 shows the anaglyph representation of the output feed from both the left camera 401 and the output feed from the right camera 402. The anaglyph representation of the zoomed regions 403 and 404 is shown in the second monitor 405.

Provided adjacent the first monitor outputs 405 is a button 425 (or indicator that a button has been pressed) allowing the difference between the output feed from the left and right camera 401 402 to be shown instead of the anaglyph representation. A similar button 430 is located adjacent the second monitor output 405 which shows a representation of the difference between the first region 403 and the second region 404. As will be appreciated, where the left and right cameras are aligned, meaning that the image output from the left and right camera are aligned, the difference between the output feeds will be zero. In other words, the monitor output will be grey. However, where the images are not perfectly aligned, there will be a difference value displayed at each pixel. This difference value will be represented on the first monitor 405 as a coloured shadow indicating the areas where alignment is not correct. The difference feature therefore provides an additional check to ensure that the alignment determined using the waveform section 410 is correct. Although the forgoing mentions the difference signal being a particular colour, the invention is not so limited. Indeed, any colour indicating a positive or negative difference value is contemplated.

After it is determined that the images are correctly aligned, the images output from the left and right camera feed are scaled to ensure that any blank areas created by the earlier adjustments disappear and the output feeds fill the available screen size.

Figure 5:
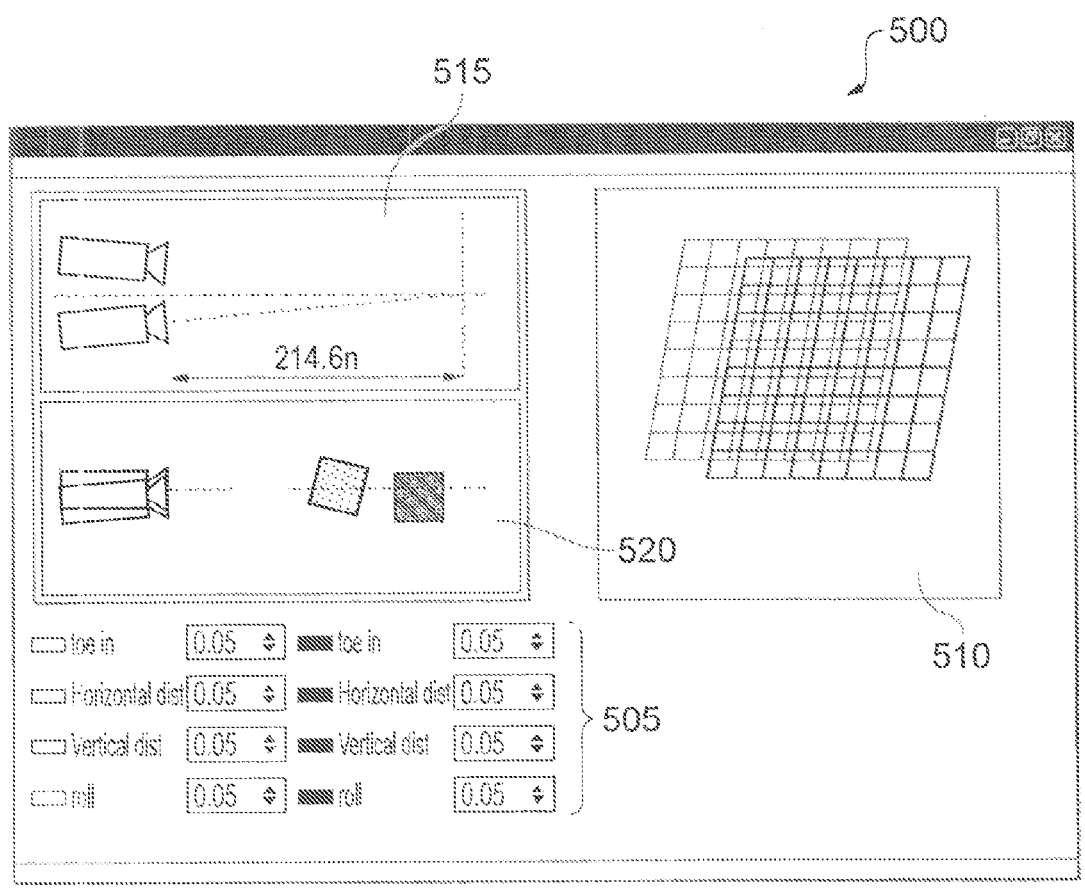
FIG. 5 shows a representation of the set-up mode in a user control system of FIG. 2.

As the output feeds from the left camera and right camera are being aligned, the user has access to a set-up screen. This is run on a separate computer. However, it may also be run by the workstation 200 although it would typically be viewed on a separate screen. A representation of the set-up screen is shown in FIG. 5. The set-up screen 500 is used to control the alignment but also includes a graphical representation of the left and right camera 515. This provides the user with the opportunity to visualise the camera arrangement. Additionally, there is a graphical representation of the left and right camera being superimposed on top of one another 520. Further, the transformation parameters determined during the alignment procedure, and controlled by the user terminal 125, are shown in area 505. These parameters can be manually adjusted by the user should they require some special effects, such as increased toe-in to be applied to the aligned image. By adjusting the camera pair toe-in or horizontal planar shifts, the apparent 3D convergence is changed. This has the effect of moving objects forwards or backwards relative to the plane of the screen upon which the resultant image will be displayed.

Moreover, in the case of appropriately aligning the images to shoot a 3D image, it is necessary to have a displacement between the images in the x direction to generate the 3D image. The corrections made to the alignment can be visualised using the user area 505. Finally, grids representing the transforms applied to the left and right camera are also displayed. This is useful because it allows the user to determine which transforms have been applied to the images to correct for the alignment. Indeed, it should be noted that the transforms replicate movement of the camera, rather than movement of the plane upon which the images will be viewed. As it is expected that only very small corrections will be applied to the images in order to appropriately align the images, these may not be easily discernible to the user of the system. Therefore, a weighting is applied which exaggerates the transforms on the grid, allowing the user to easily view the transforms. Moreover, it should be noted, that by providing this, it is easier for the user to decide that the cameras are too badly aligned and that they should be manually adjusted and the correction process re-started. This is useful to reduce the time taken to appropriately align the images.

Although the foregoing has been explained with reference to appropriately aligning the images so that a 3D image can be made from aligned images, the invention is not so limited. Indeed, there are many applications where alignment of two or more images is useful. For example, in image stitching (where a panoramic view is made up from a plurality of composite images), it is necessary to ensure that the areas of overlap are aligned. In this case it is particularly useful to align different parts of each image. For example, it is useful to align parts of different regions of different images. So, in the case of image stitching, it is useful to align a region in the far left side of one image with a region on the far right side of another image. In other words, it is useful to fully align regions of the images that overlap with one another.

As noted earlier, in embodiments of the present invention it is possible to correct for roll distortion and lens distortion. In FIG. 4, two regions in each image were selected. The images were aligned by analysing the pixel characteristics within this region. FIGS. 6A-D describes another embodiment which more easily corrects for roll distortion and lens distortion.

Figure 6A:
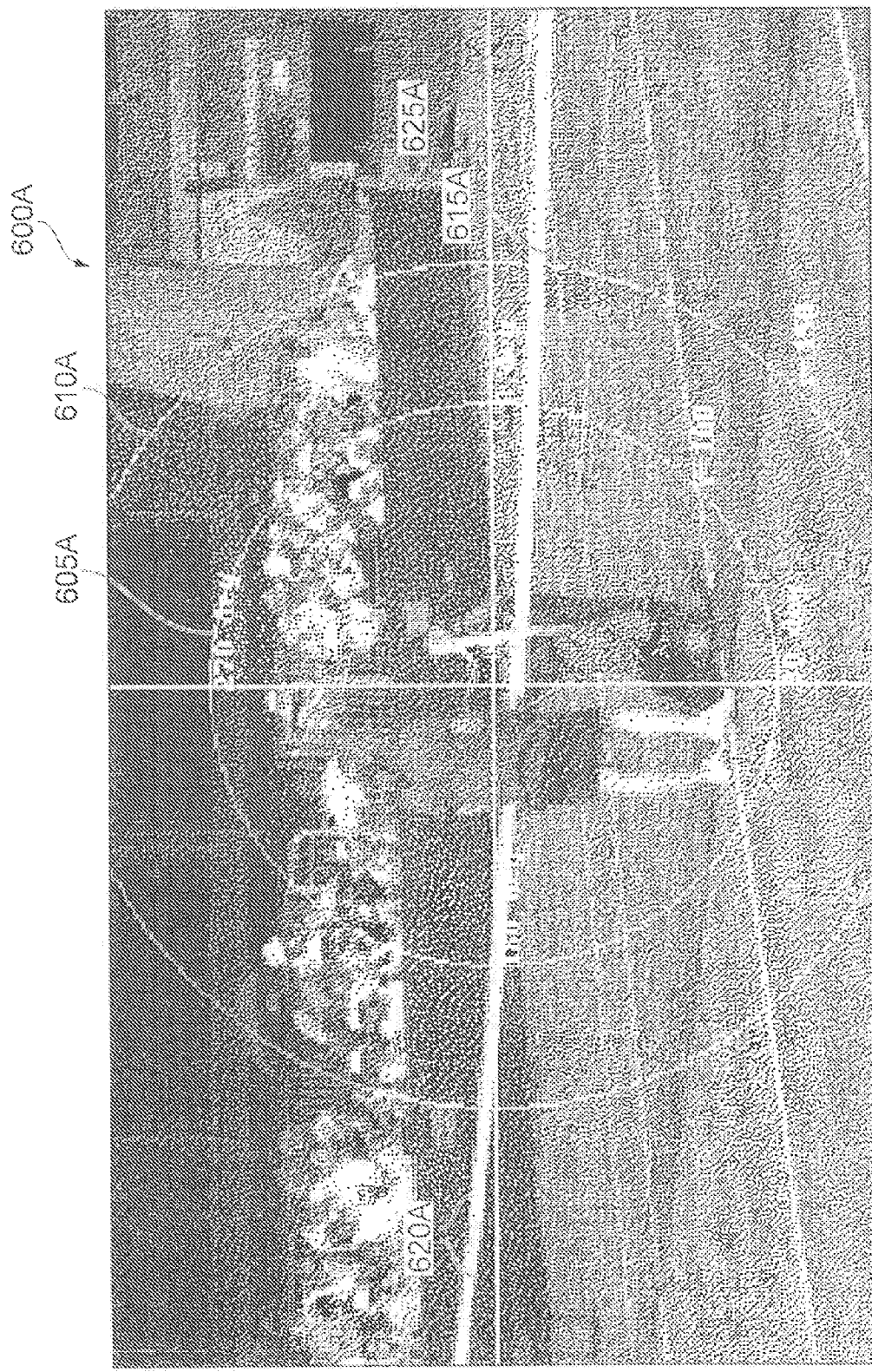
Figure 6B:

FIG. 6A shows an image having no roll distortion. FIG. 6B shows the same image as FIG. 6A with 20° of anti-clockwise roll distortion applied. An inner circular trace 605A and an outer circular trace 601A is selected in image 600A and an inner circular trace 605B and an outer circular trace 610A is selected in the roll distorted image 600B. The inner and outer circular traces are bounds of the range of radii being analysed. The circular trace in both images intersects with the same feature in the scene, namely, a first portion of the net 615A in image 600A and 615B in the roll-distorted image 600B and a second portion of the net 620A in image 600A and 620B in the roll-distorted image 600B.

As can be seen from FIGS. 6A and 6B, there is an area between the inner and outer circular traces which is 50 pixels wide (the inner circular trace has a radius of 100 pixels from the centre of the image and the outer circular trace has a radius of 150 pixels from the centre of the image). Also, as is seen in FIGS. 6A and 6B, the images 600A and 600B are bisected by a horizontal line 625A and 625B respectively. This straight horizontal line is a radial feature and defines 0°. Also, the straight line passes through the optical axis of the camera capturing the image, although this is not necessary.

Figure 6C:
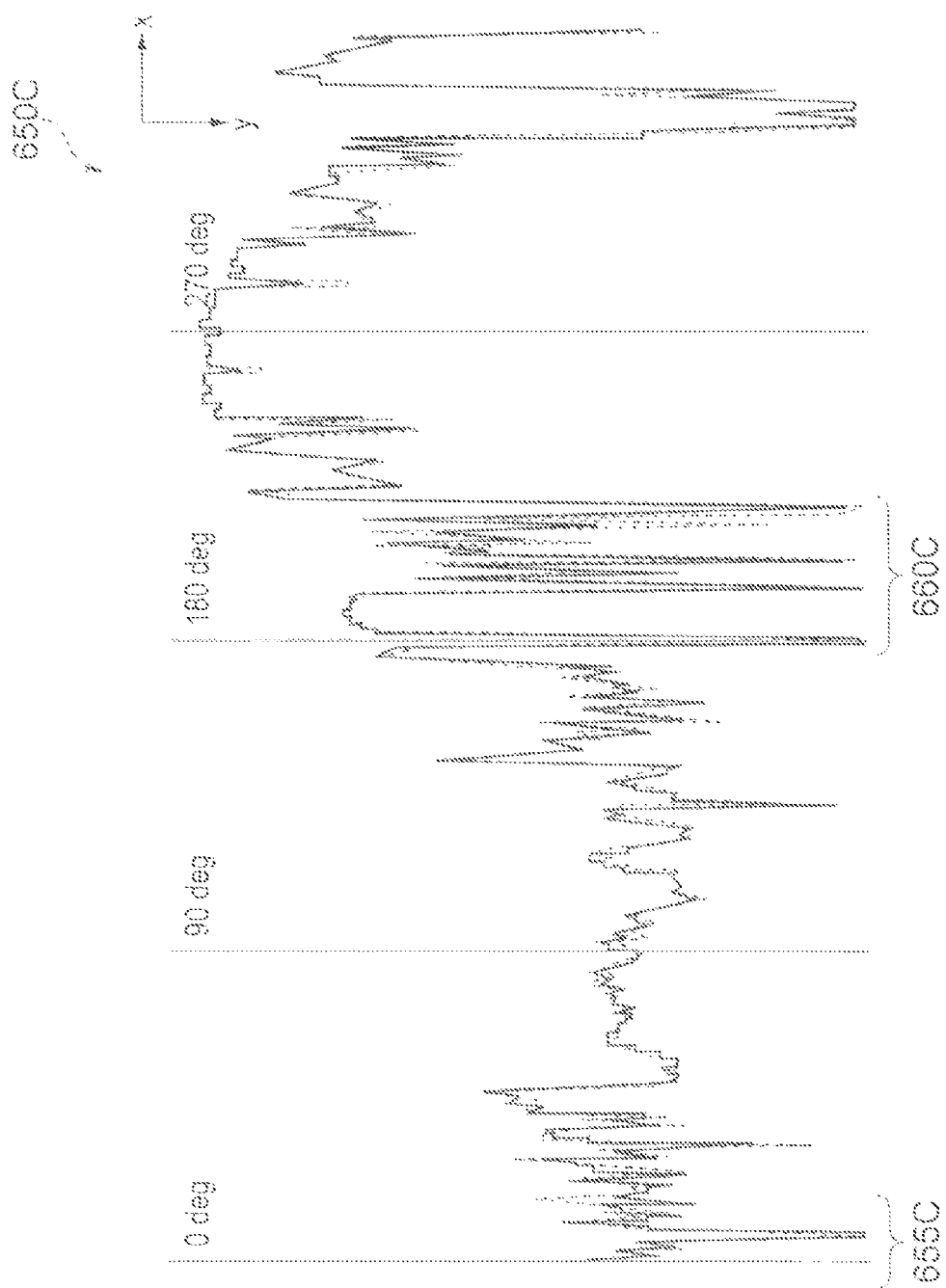

FIG. 6C shows a waveform corresponding to the image characteristics of sampling points around a circumference within the area between the inner and outer circular traces in the image 600A and FIG. 6D shows a waveform corresponding to the image characteristics of sampling points around a circumference within the area between the inner and outer circular traces in the roll distorted image 600B. This is waveform 650D. Additionally, in FIG. 6D, the waveform 650C of FIG. 6C is plotted on the same axis. This allows an easy comparison to be made between the waveforms.

In particular, the waveform is composed of a superposition of many individual traces at different radii in the specified range. An individual trace is a line graph of pixel characteristic against angle for pixels sampled at equally spaced points along a circular path at that radius. Where the sampling point does not fall precisely on a pixel location, the closest four pixels are taken and the characteristic is bilinearly interpolated to estimate the characteristic at that sampling point. In a similar manner to that described above, the image characteristics are the RGB values for each pixel although any appropriate characteristic, such as Cr, Cb value or another other characteristic is also envisaged.

In embodiments, as the image is composed of pixels and the inner and outer trace is circular, then the point in the image where the characteristic is measured is not necessarily at a pixel point. More specifically, in embodiments, as the image is composed of pixels on an orthogonal grid, and the pixel sampling points are on a polar grid, then the point in the image where the characteristic is measured is not necessarily at a pixel point. Therefore, the characteristic at the sampling point must be interpolated, either from the nearest pixel location, or from the bilinear interpolation of the nearest four pixel locations, or by some other measure.

Starting at 0°, the value of the image characteristic of each sampling point at each radius is measured.

After all the values around image 600A have been calculated, waveform 650C is generated. Waveform 650C is, in effect, a superposition of many traces at different radii. As can be seen from waveform 650C, points 655C and 660C are particularly noted. These correspond to the sections of the net 615A and 620A, respectively in image 600A. As can be seen from the x-axis, point 655C is at around 5° and point 660C is around 185°.

A similar procedure is carried out on the roll distorted image 600B. Such analysis produces waveform 650D shown in FIG. 6D. As can be seen in FIG. 6D, point 660D corresponds to section 620B in image 600B and point 655D corresponds to section 615B in image 600B. In FIG. 6D it is apparent that point 660D is positioned around 165° and point 655D is positioned around 345°. By comparing the waveforms 650C and 650D, it is apparent that image 600B is a roll distorted version of image 600A and the amount of roll distortion is 20°. Moreover, it is also apparent by comparing the waveforms 650C and 650D that the roll is in the anti-clockwise direction.

Although the foregoing roll distortion correction has been described with reference to measuring the roll distortion between two images, it is also possible to determine the roll distortion on a single camera. In order to achieve this, if a feature in the scene is at a known angle, then it is possible to measure the angle of this feature in the captured image using the above technique. By measuring the angle of the feature in the image, it is possible to determine the amount of roll of the camera.

Once the roll distortion is calculated, it is possible to apply a roll distortion transform to the image to correct for the roll distortion. This may be corrected iteratively by applying progressive correction until the traces match.

Figure 7A:
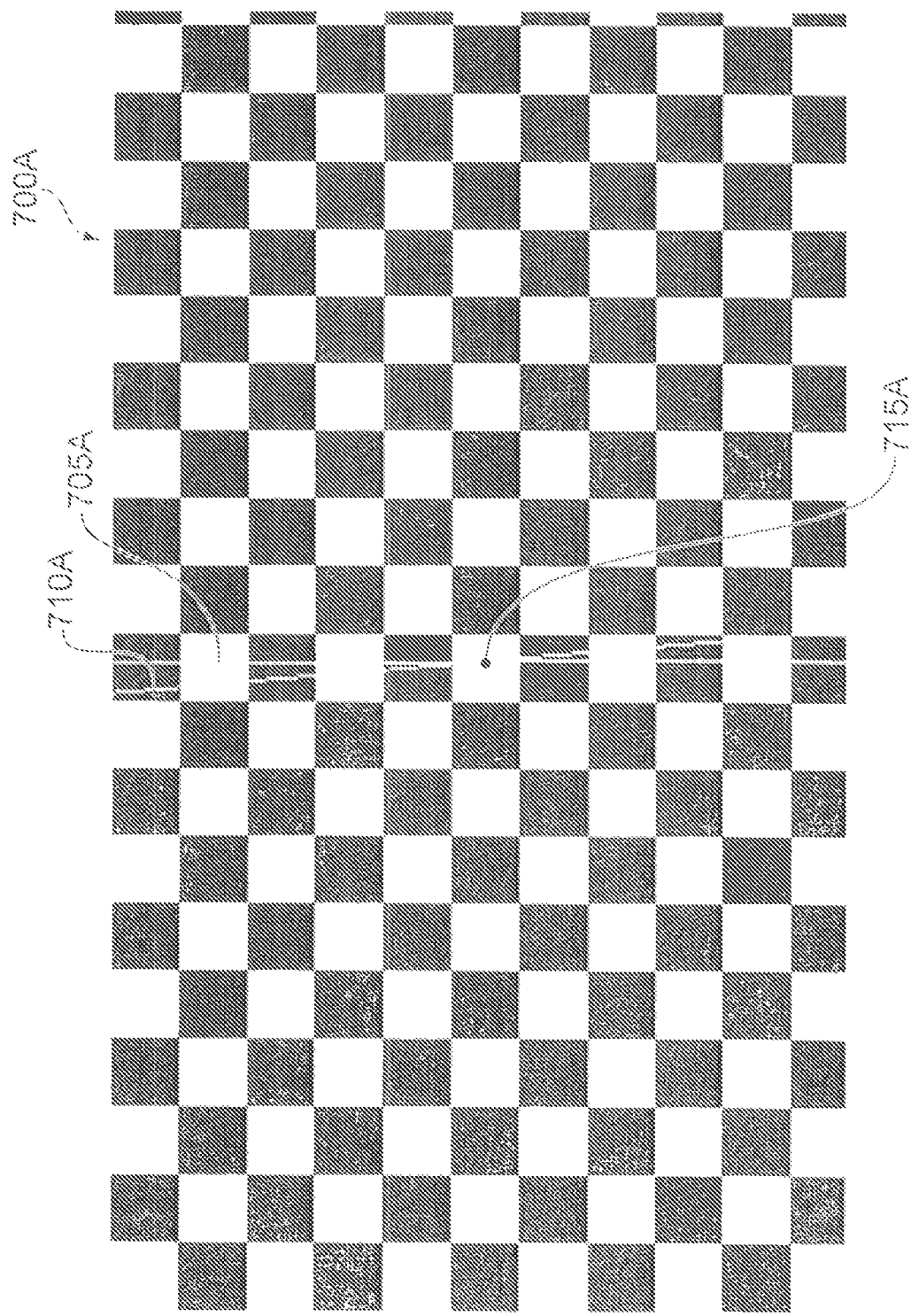
FIGS. 7A to 7D show a representation of a trace mode for establishing the amount of lens distortion according to embodiments of the present invention.

Turning to FIG. 7A, a checkerboard pattern with no lens distortion 700A is shown. On this pattern, a first radial line 705A and a second radial line 710A are drawn. This provides the boundary for the lens distortion analysis. The first radial line 705A and the second radial line 710A extend across the pattern 700A and pass through the centre of the image 700A. The centre of the image in this case is the optical axis of the camera 715A, although the invention is not so limited. Indeed, the centre of the image may be at any appropriate point in the image 700A as would be appreciated by the skilled person. Or, any point in the image could be used as the point from which the radial lines extend.

Figure 7B:
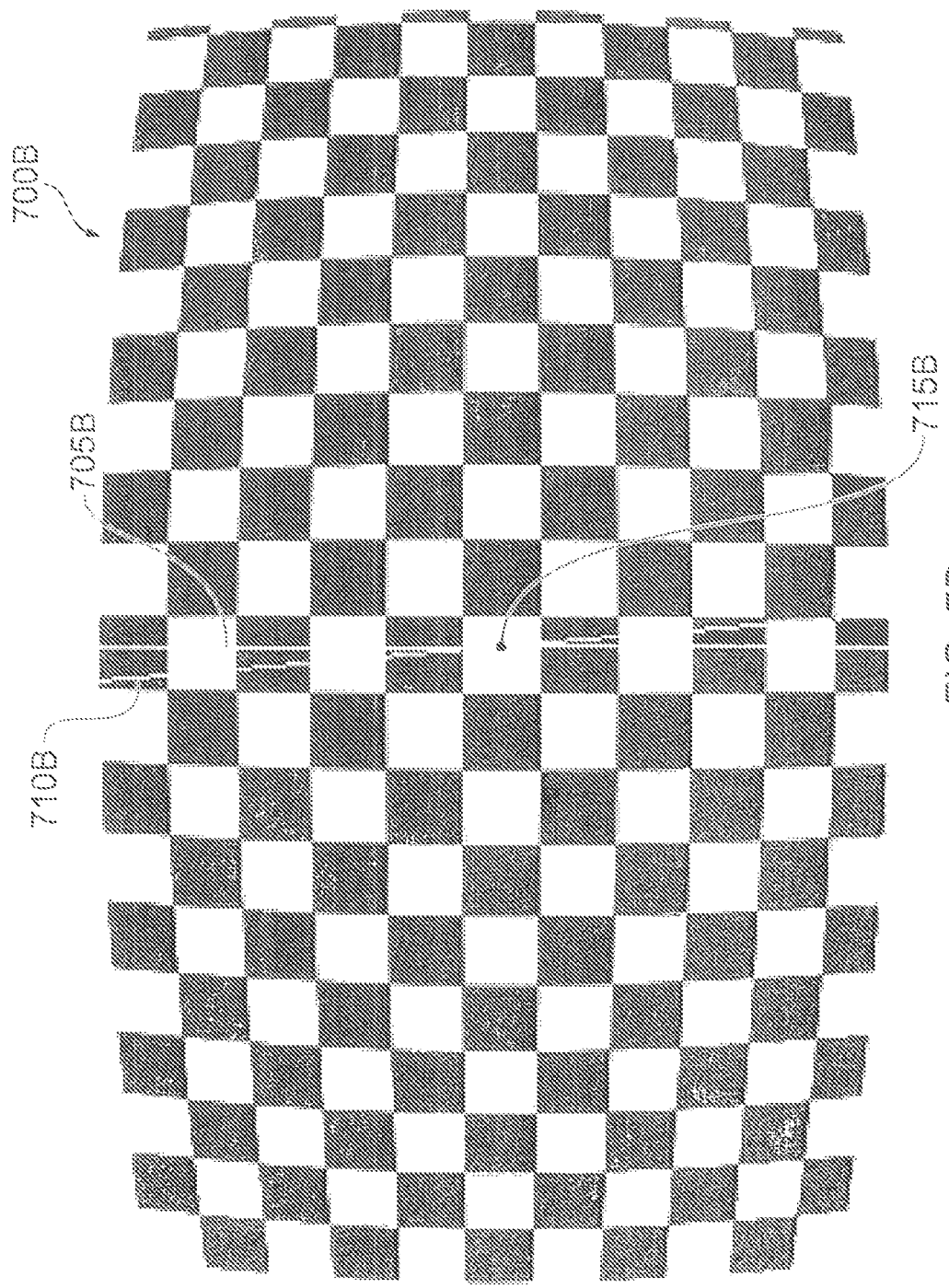
Figure 7C:
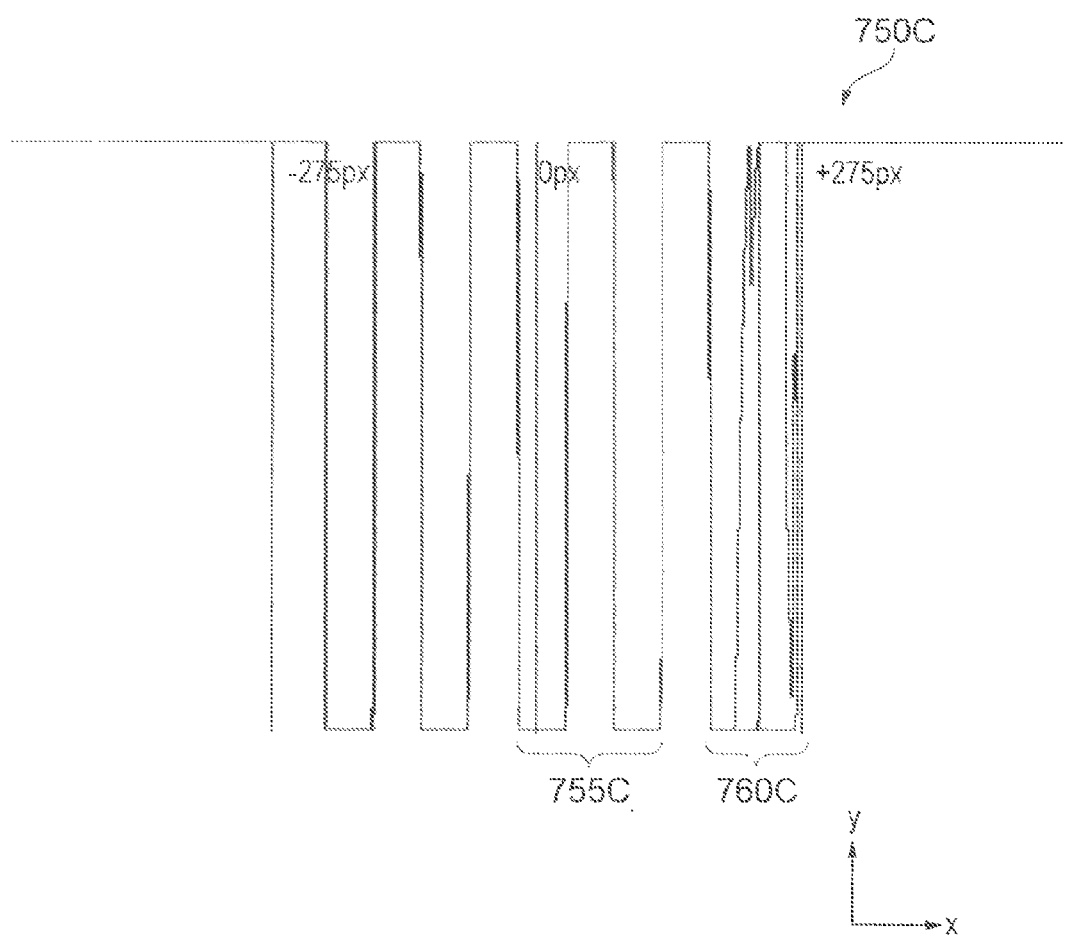

A waveform 750C corresponding to the checkerboard pattern with no lens distortion 700A is shown in FIG. 7C. The waveform is composed of the superposition of many individual traces at different angles in the specified range. An individual trace is a line graph of pixel characteristic against distance from the centre of the image, for pixels sampled at equally spaced points along a radial path at that angle. Since the sampling points are in polar co-ordinates, and the pixels are laid out in an orthogonal grid, the sampling points do not match the pixel positions exactly. Where the sampling points do not fall precisely on a pixel location, the closest four pixels are taken and the characteristic is bilinearly interpolated to estimate the characteristic at that sampling point. However, other methods of interpolation such as neighbour interpolation are envisaged.

As explained above in respect of FIGS. 6A-6D, as lines 705A and 710A are not necessarily straight, the image characteristic value at the position from the centre 715A is calculated as a bilinear interpolation of the nearest four pixels. As also explained above, the image characteristic of each position is plotted on the waveform. In other words, the image characteristic of each position between lines 705A and 710A is plotted on the waveform 750C.

As is seen in FIG. 7C, the waveform at 755C resembles a square wave pulse train. This is because the distance between line 705A and 710A is small and the checkerboard pattern has distinct white and black blocks which, given the small distance between the lines 705A and 710A, appear to change from black to white at the same distance from the centre. However, towards the outside of the image 700A, the distance between lines 705A and 710A increases. This means that in region 760C, the change from black to white takes place across a number of different pixel positions. This results in region 760C having a number of different transitions.

FIG. 7B has the checkerboard image of FIG. 7A with a large amount of negative lens distortion applied. This is shown as image 700B. A first line 705B and a second line 710B are drawn across the image 700B. Similarly to FIG. 7A, the first line 705B and the second line 710B pass through the centre of the image at point 715B. The position of the first and second line 705B and 710B is the same as for image 700A in FIG. 7A.

Figure 7D:
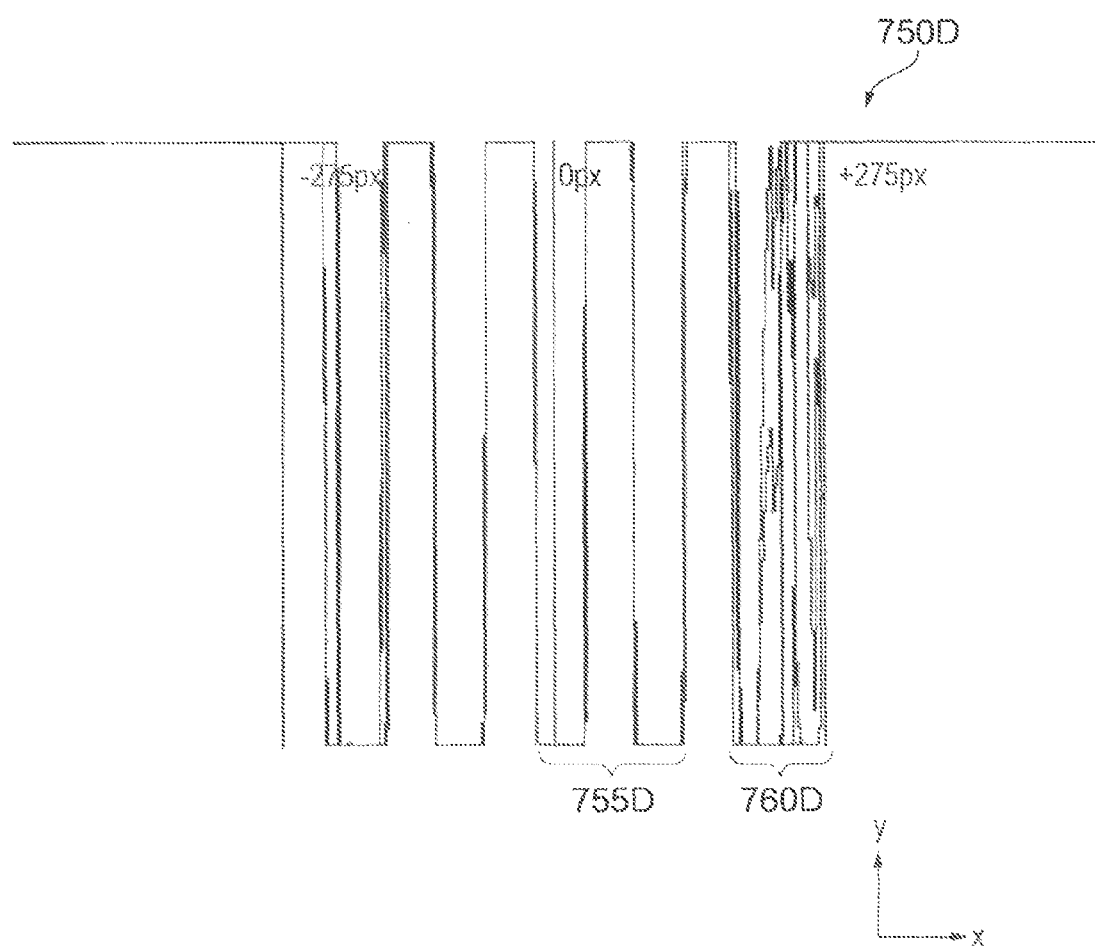

A waveform corresponding to image 700B is shown in FIG. 7D. In a similar manner to that described with regard to FIG. 7C, in FIG. 7D section 755D resembles section 755C in FIG. 7C. This is because the distance between the first line 705B and 710B is small near the centre 715B of the image 700B. The waveforms of FIGS. 7C and 7D will typically be drawn on the same axis so that easy comparison can be made.

However, towards the outer area of image 700B, the lens distortion has the effect of "squashing" the image. In other words, the number of pixels between black to white transitions decreases as the edge of the image 700B is reached. This is seen in FIG. 7D. As noted, section 755D resembles corresponding section 755C in FIG. 7C. However, in section 760D, the distance between the black to white transitions changes insofar as they get closer together. Although not shown, if there was a large degree of positive lens distortion, in the image, this would also be identifiable. With positive lens distortion, the image also looks "squashed".

Further, as in the previous examples, because the x-axis of FIG. 7D represents positions in the image, it is possible to identify the amount of lens distortion applied to the image 700B. This allows the amount of correction required to be easily determined.

Clearly although the foregoing mentions taking sampling points around a circular path and along a radial path, the skilled person will appreciate that sampling points around both a circular path and along a radial path is also envisaged.

Figure 8:
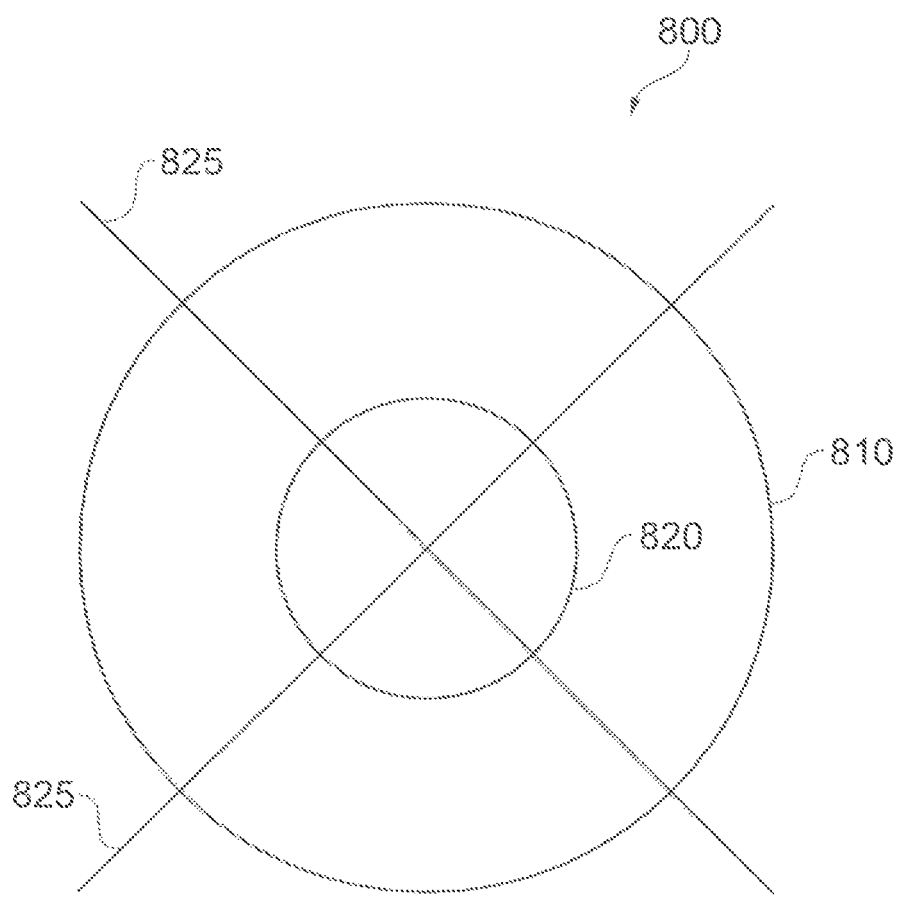
FIG. 8 shows a polar template.

FIG. 8 shows a polar trace template 800 that can be applied to images in order to assist in the alignment of two images. The polar trace 800 comprises an outer circular trace 810 and an inner circular trace 820 which shows a range of radii for individual traces in the circumferential waveform, and the range of angles of the individual traces in the radial waveforms. The regions they enclose are analogous to selected regions 404A and 404B described earlier. This enables one of two sized circular traces to be applied to both images. This is used to correct for rotation error as described with reference to FIGS. 6A-6D. Additionally, radial lines 825 which intersect at the centre of the outer circular trace 810 are provided. These two radial lines enable the lens distortion to be corrected as discussed with reference to FIGS. 7A-7D. It should be noted that although both polar lines and radial lines are shown in the Figure, either polar and/or radial lines could be displayed on the template and the appropriate correction made.

The foregoing embodiments have been described by referring to a workstation and a user terminal. However, the invention may be embodied in a different manner. For example, the workstation and user terminal may be integrated into one product including all the necessary user input devices. Also, embodiments of the invention may be a computer program which contains computer readable instructions. Also, the computer program may be embodied in signals which can be transferred over a network, such as the Internet or stored on a storage medium such as an optical disk. Finally, the invention may be embodied as a storage medium which contains the computer program.

We claim:

1. A method of determining an amount of a mis-alignment in a direction of a first image of a scene, the first image captured by a first camera, the method comprising the steps of:

defining a first line between a first point in the first image and a second point in the first image, the first line extending in the direction of the mis-alignment;

defining a reference section in the scene to which the first image is being aligned, the reference section of the scene having a first reference image characteristic;

identifying a first image characteristic at a first plurality of points along the first line in the first image;

comparing the first image characteristic at each point of the first plurality of points along the first line with the first reference image characteristic, and determining the amount of the mis-alignment by determining a distance between a position of the first reference image characteristic of the reference section captured in the first image and the defined reference section in the scene; and defining at least one of a circular sampling path and a radial sampling path in the first image, wherein the circular sampling path defines a circular path between the first point and the second point and the radial sampling path passes through a centre point of the first image coincident with a corresponding point in the first image and extending along a radial line therefrom, the first line between the first and the second points in the first image being defined by one or more of the circular sampling path or the radial sampling path.

2. The method according to claim 1, further comprising the steps of:

capturing a second image using a second camera;

defining a second line between a third point in the second image and a fourth point in the second image, the second line being drawn in the direction of the mis-alignment and intersecting with the reference section, the reference section further having a second reference image characteristic;

identifying a second image characteristic at a second plurality of points along the second line in the second image; and comparing the first image characteristic at each point of the first plurality of points along the first line in the first image with the second image characteristic at each point of the second plurality of points along the second line in the second image, wherein the first image and the second image have an area of overlap and the reference section in the scene is located in the area of overlap, and the amount of the mis-alignment is determined in accordance with a difference between the position of the first reference image characteristic in the first image and a position of the second reference image characteristic in the second image.

3. The method according to claim 1, wherein the first image characteristic in the first image or the second image characteristic in the second image are formed by interpolation of a plurality of pixel values.

4. The method according to claim 3, wherein the interpolation is bilinear interpolation of four adjacent pixel values.

5. The method according to claim 1, further comprising the step of:

displaying a polar and/or a radial template in the first image, the polar template having a circular template line and a radial template line having the centre point coincident with a corresponding point in each respective image and extending along the radial line therefrom, the first line between the first and second points in the first image being defined by one or more of the circular template line and/or the radial template line.

6. The method according to claim 1, further comprising the step of:

determining the first and the second image characteristics at positions in an area surrounding the first line or second line, the positions being a substantially similar distance from an optical axis of the first or the second camera capturing the first or the second image, respectively.

7. The method according to claim 1, wherein the centre point through which the radial line passes is the optical axis of the first camera capturing the first image.

8. The method according to claim 1, wherein a centre of the circular sampling path corresponds to the optical axis of the first or the second camera capturing the first or the second image.

9. The method according to claim 1, further comprising the step of:

plotting a value of an image property at each sampling point along the circular or the radial sampling path against a position of the sampling point along the circular or the radial sampling path.

10. The method according to claim 1, further comprising the step of:

transforming the first image until the distance between the first image characteristic and the reference section is within a predetermined threshold.

11. The method according to claim 10, wherein the first image is transformed along the first line between the first point and the second point.

12. The method according to claim 11, wherein the first line in the first image and the second line in the second image are a circular line, and the first image has a roll transformation applied thereto.

13. The method according to claim 11, wherein the first line in the first image and the second line in the second image are a radial line and the second image has a transformation applied along the length of the radial line.

14. A non-transitory computer readable storage medium having computer readable instructions stored thereon, which, when executed by a computer causes the computer to perform the method according to claim 1.

15. The computer readable storage medium configured to store the computer program of claim 14 therein or thereon.

16. An apparatus for determining an amount of a mis-alignment in a direction of a first image of a scene, the first image captured by a first camera, the apparatus comprising:

a first definer configured to define a first line between a first point in the first image and a second point in the first image, the first line being extended in the direction of the mis-alignment, and configured to define a reference section in the scene to which the first image is being aligned, the reference section of the scene having a first reference image characteristic;

an identifier configured to identify a first image characteristic at a first plurality of points along the first line in the first image;

a comparator configured to compare the first image characteristic at each point of the first plurality of points along the first line with the first reference image characteristic, and to determine the amount of the mis-alignment by determining a distance between a position of the first reference image characteristic of the reference section captured in the first image and the defined reference section in the scene; and a second definer configured to define at least one of a circular or radial sampling path in the first image, the circular sampling path defining a circular path between the first point and the second point and a radial sampling path passing through a centre point of the first image coincident with a corresponding point in the first image and extending along a radial line therefrom, the first line between the first and the second points in the image being defined by one or more of the circular sampling path or the radial sampling path.

17. The apparatus according to claim 16, further comprising:
an input connectable to a second camera which is configured to capture a second image, wherein
the first definer is further configured to define a second line extending between a third point in the second image and a fourth point in the second image, the second line extending in the direction of the mis-alignment and intersecting with the reference section, the reference section further having a second reference image characteristic,
the identifier is further configured to identify a second image characteristic at a second plurality of points along the second line in the second image,
the comparator is further configured to compare the first image characteristic at each point of the first plurality of points along the first line in the first image with the second image characteristic at each point of the second plurality of points along the second line in the second image,
the first image and the second image have an area of overlap and the reference section in the scene is located in the area of overlap, and
the amount of mis-alignment is determined in accordance with a difference between the position of the first reference image characteristic in the first image and a position of the second reference image characteristic in the second image.

18. The apparatus according to claim 16, wherein the first image characteristic in the first image or the second image characteristic in the second image are formed by interpolation of a plurality of pixel values.

19. The apparatus according to claim 18, wherein the interpolation is bilinear interpolation of four adjacent pixel values.

20. The apparatus according to claim 16, further comprising:
a display configured to display at least one of a polar or a radial template in the first image, the polar template having a circular template line and a radial template line having the centre point coincident with a corresponding point in each respective image and extending along the radial line therefrom, the first line between the first and second points in the first image being defined by one or more of the circular template line or the radial template line.

21. The apparatus according to claim 16, wherein the determiner is further configured to determine the first and the second image characteristics at positions in an area surrounding the first line or second line, the positions being a substantially similar distance from an optical axis of the first or the second camera capturing the first or the second image, respectively.

22. The apparatus according to claim 16, wherein the point from which the radial line radiates is the optical axis of the first camera capturing the first image.

23. The apparatus according to claim 16, wherein a centre of the circular sampling path corresponds to the optical axis of the first or the second camera.

24. The apparatus according to claim 16, further comprising:
a plotter configured to plot a value of an image property at each sampling point along the circular or the radial sampling path against a position of the sampling point along the circular or the radial sampling path.

25. The apparatus according to claim 16, further comprising:
a transformer configured to transform the first image until the distance between the first image characteristic and the reference section is below a threshold distance.

26. The apparatus according to claim 25, wherein the first image is transformed along the first line extending between the first point and the second point.

27. The apparatus according to claim 25, wherein the line in the first image and the line in the first image is a circular line, and the first image has a roll transformation applied thereto.

28. The apparatus according to claim 26, wherein the first line in the first image and the second line in the second image are a radial line and the first image has a transformation applied along the length of the radial line.

29. A system comprising a first and second camera connected to the apparatus according to claim 16.

* * * * *